United States Patent [19]

Nowack et al.

[11] Patent Number: 4,933,159

[45] Date of Patent: Jun. 12, 1990

[54] SORPTION OF TRIALKYL ARSINES

[75] Inventors: Gerhard Nowack; Patricia A. Tooley; Joseph B. Cross; Marvin M. Johnson; Ted Cymbaluk, all of Bartlesville, Okla.

[73] Assignee: Phillips Petroleum Company, Bartlesville, Okla.

[21] Appl. No.: 430,993

[22] Filed: Nov. 2, 1989

[51] Int. Cl.$^5$ .................. B01D 15/00; B01D 53/34; C10G 25/00
[52] U.S. Cl. .................. 423/245.1; 210/673; 210/690; 210/908; 208/294; 208/296; 585/820; 585/822; 585/826
[58] Field of Search .................. 423/245.1, 210; 208/294, 296; 585/820, 822, 826; 210/673, 674, 690, 691, 694, 908

[56] References Cited

U.S. PATENT DOCUMENTS

| 2,511,288 | 6/1950 | Morrell et al. | 502/417 |
| 2,511,289 | 6/1950 | Morrell et al. | 502/417 |
| 2,920,050 | 1/1960 | Blacet et al. | 502/417 |
| 4,048,387 | 9/1977 | Lahme et al. | 423/210 |
| 4,420,567 | 12/1983 | McMahon et al. | 436/169 |
| 4,578,256 | 3/1986 | Nishino et al. | 423/210 |
| 4,593,148 | 6/1986 | Johnson et al. | 423/210 |

FOREIGN PATENT DOCUMENTS 68034  4/1985  Japan .................. 423/210

Primary Examiner—Jeffrey E. Russel
Attorney, Agent, or Firm—K. K. Brandes

[57] ABSTRACT

Trialkyl arsines are removed from fluids, in particular gases, by contacting with a solid sorbent material containing at least one silver component (preferably nitrate and/or oxide and/or metal) and a support material (preferably alumina, fluorided alumina, silica, fluorided silica, titania or magnesium aluminate).

25 Claims, No Drawings

SORPTION OF TRIALKYL ARSINES

BACKGROUND OF THE INVENTION

This invention relates to the removal of trialkyl arsines from fluids by means of solid sorbents. In another aspect, this invention relates to the removal of trialkyl arsines from gases, in particular hydrocarbon-containing gases.

Materials for adsorbing and/or absorbing unsubstituted arsine ($AsH_3$) are well known. However, many of these materials are ineffective for the sorption of trialkyl arsines, which may be present as undesirable impurities in natural gas streams produced at some well sites. This invention provides sorbent materials which are quite effective in removing trialkyl arsines from fluids, in particular gases, by sorption (i.e., adsorption and/or absorption).

SUMMARY OF THE INVENTION

It is an object of this invention to provide a process for removing trialkyl arsines from fluids. It is another object of this invention to provide a process for removing trialkyl arsines from gases, in particular hydrocarbon-containing gases. Other objects will become apparent from the detailed description of the invention and the appended claims.

In accordance with this invention, a process for at least partially removing trialkyl arsines from fluids (preferably gases) comprises the step of contacting said fluid feed which contains at least one trialkyl arsine with a solid sorbent material comprising (preferably consisting essentially of) (a) at least one silver component (preferably at least one of silver metal, silver oxide and silver nitrate) and (b) an inorganic support material (preferably selected from the group consisting of alumina, fluorided alumina, aluminum phosphate, silica, fluorided silica, aluminosilicates such as clays or zeolites, titania, zirconia, hafnia, aluminates of zinc, aluminates of metals of Group IIA of the Periodic Table [as defined on page 852 of Webster's New Collegiate Dictionary, 1977], titanates of zinc, titanates of Group IIA metals, activated carbon, and mixtures of the above materials); wherein said contacting is carried out at such contacting conditions as to obtain a fluid product having a lower trialkyl arsine content than said feed and to obtain a used sorbent material containing that portion of said at least one trialkyl arsine which has been removed from the feed.

DETAILED DESCRIPTION OF THE INVENTION

The term "trialkyl arsine", as used herein, refers to compounds having the general chemical formula of $R_3As$, wherein each R is a radical independently selected from among alkyl groups (straight and/or branched), preferably having 1-6 (more preferably 1-3) carbon atoms per molecule. Particularly preferred trialkyl arsines are trimethyl arsine, triethyl arsine, dimethyl ethyl arsine and diethyl methyl arsine.

Any suitable liquid or gaseous fluid stream which contains trialkyl arsine(s) can be used as feed in the process of this invention. Preferably, the feed is gaseous. Non-limiting examples of suitable feeds are: natural gas; gaseous petroleum fractions comprising paraffins and olefins containing 1-6 carbon atoms per molecule; and gaseous products from thermal and catalytic cracking of petroleum, shale oil or coal. Generally, the gases comprise methane, ethane, ethylene, propane, propylene, n-butane, isobutane, butenes; and the like. These gas streams can contain other impurities, such as hydrogen sulfide, carbonyl sulfide (COS), mercaptans, organic sulfides, carbon monoxide, carbon dioxide, inert gases ($N_2$, He, Ne, Ar), and the like. Other arsenic compounds may also be present in the fluid stream which is treated by the process of this invention, such as $AsH_3$, $RAsH_2$, $R_2AsH$, $R_3AsO$ (trialkyl arsine oxides), $R_3AsS$ (trialkyl arsine sulfides), and the like; wherein R is an alkyl group, as defined above. It is also possible to have triphenyl arsine, dialkyl phenyl arsines, dialkyl cycloalkyl arsines, and the like present in the feed. Preferably, free oxygen is substantially absent from the feed.

Generally, the total concentration of the trialkyl arsine(s) in the feed (preferably gaseous) is in the range of from about 1 ppb (1 part by weight of trialkyl arsine per billion parts by weight of feed) to about 0.1 weight-%, preferably about 0.1–100 ppm (parts by weight trialkyl arsine per million parts by weight of feed). The concentrations of the other impurities and the exact composition of the feed will widely vary from feedstock to feedstock.

The sorbent materials which are used in the process of this invention comprise at least one silver component and an inorganic support material onto which the silver component is deposited. Preferably, silver component (a) is selected from the group consisting of silver metal, silver oxide ($Ag_2O$), silver fluoride, silver nitrate, silver sulfate, silver pyrosulfate, silver thiosulfate, silver carboxylates (e.g., acetate), silver phosphate ($Ag_3PO_4$), silver pyrophosphate ($Ag_4P_2O_7$), silver sulfide, and mixtures thereof; more preferably silver metal or silver oxide or silver nitrate or mixtures thereof. Generally the silver content in the sorbent is in the range of from about 1 to about 30, preferably from about 2 to about 15, weight-% Ag.

Any suitable, effective inorganic support material can be employed as component (b). Preferably, the support material is selected from the group consisting of alumina, fluorided alumina, aluminum phosphate, silica, fluorided silica, titania ($TiO_2$), zirconia ($ZrO_2$), hafnia ($HfO_2$), zinc aluminate ($ZnAl_2O_4$) aluminates of Group IIA metals (i.e., of Be, Mg, Ca, Sr, Ba), zinc titanate ($Zn_2TiO_4$), titanates of Group IIA metals, activated carbon, and mixtures of two or more than two of the above compounds. Presently more preferred support materials are alumina, fluorided alumina, silica, fluorided silica, titania and magnesium aluminate ($MgAl_2O_4$). The term "fluorided" means that the support material (alumina or silica) has been treated with a fluoriding compound, preferably HF or $NH_4HF_2$, under such conditions as to incorporate fluoride ions into the crystal lattice of alumina or silica. The fluoriding procedure is described in greater detail in Example 1.

The sorbent particles can have any suitable surface area (such as about 10–500 $m^2/g$, as measured by the B.E.T. method employing $N_2$), any suitable shape (spherical, cylindrical, ring-shaped, trilobal etc.), and any suitable size (such as about 0.2–20 mm diameter for spherical particles).

Any suitable contacting conditions can be employed in the sorption process of this invention. Generally the temperature in the contacting zone is in the range of from about −20° to about 100° C., preferably about 20° to about 50° C. Generally the pressure in the contacting zone is in the range of from about 1 to about 500 atm., preferably about 1 to about 70 atm. Generally the gas hourly space velocity of the gaseous feed in the contacting zone is in the range of from about 1 to about 10,000 volume of feed/volume of sorbent/hour, preferably about 1,000 to about 3,000 volume/volume/hour, measured at about 25° C./1 atm. Generally the contacting is continued until trialkyl arsine breakthrough occurs, i.e., when the treated product contains more trialkyl arsines than can be tolerated, such as about 50 ppb.

Treatment of the feed streams in accordance with the process of this invention can be carried out in any suitable manner. For example, in a preferred embodiment a bed of the sorbent is placed as a fixed bed in a confined zone, and a fluid stream (preferably a gas) is passed therethrough in either upward or downward flow. Other suitable, yet less preferred methods of treatment can include a fluidized operation in which the feed and the sorbent particles are maintained in a state of turbulence under hindered settling conditions in a confined zone, moving bed operations in which the sorbent passes as a moving bed countercurrently to or concurrently with the feed, etc. In a fixed bed operation of a continuous process, the flow of fluid can be rotated between two or more sorbent beds with at least one being in regular operation, the other being in a regeneration mode. Continuous processes are preferred, but it is understood that batch type operations can be employed when desired.

The sorbent composition after it has reached its maximum capacity for trialkyl arsines is capable of being regenerated. Regeneration can be accomplished by conventional means, preferably by an oxidation step employing a free oxygen containing gas (e.g., air), whereby at least a portion of silver in said sorbent composition is converted to $Ag_2O$. Generally an elevated temperature is desirable during the oxidative operation, usually a temperature exceeding 50° F.

It is within the scope of this invention to employ a combination of sorbents, such as a first bed of a supported CuO-ZnO material (described in U.S. Pat. No. 3,593,148) for removal of a major portion of $AsH_3$ or $H_2S$ or both from the feed, and at least one subsequent downstream bed containing at least one of the sorbent materials of this invention for absorbing primarily trialkyl arsines. This multi-bed operation can be carried out in one reactor containing a layer of the supported CuO-ZnO material (or any other known sorbent for $AsH_3$ and $H_2S$) and a downstream layer of a trialkyl arsine sorbent of this invention. Or the multi-bed operation can be carried out using two or more separate sorption reactors: at least one first reactor containing the supported CuO-ZnO material (or any other known sorbent for $AsH_3$ and $H_2S$) and at least one second reactor containing the trialkyl arsine sorbent of this invention, wherein the feed passes through the first reactor(s) and thereafter through the second reactor(s).

The process of this invention will be further illustrated by the following non-limiting examples.

EXAMPLE I

This example illustrates the preparation of trialkyl arsine sorbent materials.

Sorbent A contained about 10 weight-% Ag (as nitrate and/or oxide) and alumina as support material. Sorbent A was prepared by mixing 3.62 g alumina (provided by Kaiser Aluminum Company under the product designation "S-201"), with a solution of 0.63 g $AgNO_3$ in 2 cc distilled water. The thus impregnated alumina was dried at about 65° C. for 2 days and heated in air at 200° C. for 1 hour.

Sorbent B contained about 5 weight-% Ag (as nitrate and or oxide) and fluorided alumina as support material. This sorbent material was prepared as follows. 80 g of S-201 alumina was calcined for several hours at 350°-650° C. and then for 3 hours at 800° C. The thus calcined material was mixed with a solution of 12 g $NH_4HF_2$ ($NH_4F.HF$) in 160 g $H_2O$. The reaction of alumina with $NH_4HF_2$ was monitored by measuring the pH. When the solution became basic, the formed fluorided alumina was washed thoroughly, air-dried, and heated for 7 hours at 70° C. and for 1 hour at 200° C. The dried, calcined fluorided alumina was mixed with a solution of 6.3 g $AgNO_3$ in 60 cc water. The thus impregnated material was air-dried, and heated in air for 2 hours at 70°-125° C. for 1 hour at 275° C., for 1 hour at 400° C. and, finally, for 1 hour at 500° C.

Sorbent C contained about 5 weight-% Ag, primarily as Ag phosphate, and alumina as support material. Sorbent C was prepared as follows. 36.6 g $AgNO_3$ was completely dissolved in water. Then 8.4 g 85% $H_3PO_4$ was added to the $AgNO_3$ solution to precipitate Ag phosphate. The precipitate was dissolved by the addition of nitric acid. This solution was mixed with 300 g alumina ("H 151", provided by Aluminum Company of America) which had been calcined for 4 hours at 260° C. The thus impregnated alumina was dried in an oven and calcined for about 16 hours at 260° C. in a nitrogen atmosphere.

Sorbent D contained 5 weight-% Ag (as nitrate and/or oxide) and silica as support material. Sorbent D was prepared by mixing 10 g silica (provided by Calsicat, a division of Mallinckrodt, Inc.) having a particle size of about 0.4–1.7 mm (10–40 mesh) with a solution of 0.79 g $AgNO_3$ in distilled water. The thus impregnated material was heated in air for 3 hours at 125° C. and then for 1 hour at 200° C.

Sorbent E contained 5 weight-% Ag (as nitrate and/or oxide) and fluorided silica as support material. Sorbent E was prepared substantially in accordance with the procedure described for Sorbent D, except that silica had been fluorided by the reaction with $NH_4HF_2$, substantially as described for the fluoriding of alumina for Sorbent B.

Sorbent F contained 10 weight-% Ag (as nitrate and/or oxide) and titania as support material. Sorbent F was prepared by mixing 5 g of 10–40 mesh $TiO_2$ (provided by Calsicat) with a solution of 0.79 g $AgNO_3$ in distilled water. The thus impregnated material was dried for 3 hours at 125° C. and then heated for 1 hour in air at 200° C.

Sorbent G contained 5 weight-% Ag (as nitrate and/or oxide) and magnesia as support material. Sorbent G was prepared substantially in accordance with the procedure for Sorbent D except that MgO was used (in lieu of $SiO_2$).

Sorbent H contained 5 weight-% Ag (as nitrate and/or oxide) and magnesium aluminate ($MgAl_2O_4$, provided by Haldor-Topsoe, Inc.) as support material. 10 g of 10–40 mesh $MgAl_2O_4$ was mixed with a solution of 0.79 g $AgNO_3$ in 8 cc distilled water. The thus impregnated material was dried for 8 hours at 70° C. and then heated for 1 hour in air at 200° C.

Sorbent I contained 10 weight-% Ag as $Ag_2S$ and alumina as support material. It was prepared by passing $H_2S$ gas over spent Sorbent A (which had absorbed trimethyl arsine) for about 1 hour at room temperature.

Thereafter, H₂S was purged from the material by passing N₂ over it for about 1.5 hours. Sorbent I had a dark-brown color.

EXAMPLE II

This example illustrates the absorption of an alkyl arsine by the sorbent materials described in Example I.

A nitrogen gas stream was passed through a flask containing liquid trimethyl arsine (provided by Strem Chemicals, Inc.), which was cooled to about $-78°$ C. by placing the flask in a dry ice/acetone mixture. The gas stream, which contained N₂ and trimethyl arsine, was passed through a glass tube of about 7 mm diameter and about 12 cm length containing about 1 gram of one of the sorbents described in Example I. The gas which exited from the absorption tube was passed through an aqueous solution of $KMnO_4$ and then to a flow meter.

When trimethyl arsine breakthrough occurred (i.e., when the sorbent had reached its maximum arsine absorption capacity), the purple color of the $KMnO_4$ solution turned brownish. After arsine breakthrough had been detected, the flow of the trimethyl arsine containing gas stream was stopped, and a purge stream of pure nitrogen was passed through the sorbent material for about 1-2 hours so as to purge unabsorbed trimethyl arsine therefrom. The absorption tube containing the sorbent and absorbed trimethyl arsine was weighed. The difference between this weight and the initial weight of the tube with fresh sorbent was the weight of absorbed trimethyl arsine. Test results are summarized in Table I.

TABLE I

| Sorbent | Millimole Absorbed Trimethyl Arsine per Gram Sorbent | Atomic Ratio of Absorbed As to Ag in Sorbent |
|---|---|---|
| A | 0.63 | 0.67:1 |
| B | 0.27 | 0.59:1 |
| C | 0.05 | 0.11:1 |
| D | 0.29 | 0.63:1 |
| E | 0.44 | 1.00:1 |
| F | 0.73 | 0.77:1 |
| G | 0 | 0 |
| H | 0.34 | 0.71:1 |
| I | 0.12 | 0.13:1 |

Test data in Table I show that Sorbent G (Ag nitrate/oxide on MgO) was not effective as a trimethyl arsine sorbent. Of the other sorbents, those with alumina, fluorided alumina, silica, fluorided silica, titania and Mg aluminate as support (Sorbents A, B, D, E, F and H) were most effective as trimethyl arsine sorbents (because they exhibited the highest As:Ag ratios). Most effective was Sorbent E which contained silver nitrate and/or oxide on fluorided silica.

In separate tests, it was determined that the support materials without a silver compound deposited thereon (i.e., the support materials used for preparing Sorbents A-I) did not absorb any trimethyl arsine.

Reasonable variations and modifications which will be apparent to those skilled in the art, can be made within the scope of the disclosure and appended claims without departing from the scope of this invention.

That which is claimed is:

1. A process for at least partially removing trialkyl arsines from fluids comprising the step of contacting a fluid feed which contains at least one trialkyl arsine with a solid sorbent material comprising (a) at least one silver component and (b) an inorganic support material; wherein said contacting is carried out at such contacting conditions as to obtain a fluid product having a lower trialkyl arsine content than said feed and to obtain a used solid sorbent material containing that portion of said at least one trialkyl arsine which has been removed from said feed.

2. A process in accordance with claim 1, wherein said fluid is a gas.

3. A process in accordance with claim 1, wherein said fluid is a hydrocarbon-containing gas.

4. A process in accordance with claim 1, wherein said trialkyl arsine has the chemical formula of $R_3As$ with each R being independently selected from the group consisting of alkyl groups containing 1-6 carbon atoms per molecule.

5. A process in accordance with claim 4, wherein said alkyl groups contain 1-3 carbon atoms per molecule.

6. A process in accordance with claim 1, wherein said feed is a gas and said at least one trialkyl arsine is selected from the group consisting of trimethyl arsine, triethyl arsine, dimethyl ethyl arsine and diethyl methyl arsine.

7. A process in accordance with claim 1, wherein said feed contains about 1 ppb to about 0.1 weight-% of said at least one trialkyl arsine.

8. A process in accordance with claim 1, wherein said feed is a gas, and said at least one silver component (a) is selected from the group consisting of silver metal, silver oxide, silver fluoride, silver nitrate, silver sulfate, silver pyrosulfate, silver thiosulfate, silver carboxylates, silver phosphate, silver pyrophosphate, silver sulfide, and mixtures thereof.

9. A process in accordance with claim 8, wherein said at least one silver component (a) is selected from the group consisting of silver metal, silver nitrate, silver oxide and mixtures thereof.

10. A process in accordance with claim 1, wherein said feed is a gas, and said inorganic support material (b) is selected from the group consisting of alumina, fluorided alumina, aluminum phosphate, silica, fluorided silica, aluminosilicates, titania, zirconia, hafnia, aluminates of zinc, aluminates of Group IIA metals, titanates of zinc, titanates of Group IIA metals, activated carbon and mixtures thereof.

11. A process in accordance with claim 10, wherein said inorganic support material (b) is selected from the group consisting of alumina, fluorided alumina, silica, fluorided silica, titania and magnesium aluminate.

12. A process in accordance with claim 1, wherein said solid sorbent material contains about 1-30 weight-% Ag.

13. A process in accordance with claim 8, wherein said solid sorbent material contains about 2-15 weight-% Ag.

14. A process in accordance with claim 1, wherein said feed is a gas, and said contacting conditions comprise a temperature in the range of from about $-20°$ to $100°$ C.

15. A process in accordance with claim 1, wherein said feed is a gas, and said contacting is carried out in a contacting zone containing said solid sorbent material in a fixed bed.

16. A process in accordance with claim 1, wherein said feed is a gas and additionally contains at least one of H₂S and AsH₃.

17. A process in accordance with claim 1, wherein said feed is a gas which additionally contains at least one of H₂S and AsH₃, and said gas is passed through a bed of a CuO-ZnO containing material prior to said contacting with said solid sorbent material.

18. A process for at least partially removing trialkyl arsines from fluids comprising the step of contacting a fluid feed which contains at least one trialkyl arsine with a solid sorbent material comprising (a) a silver component selected from the group consisting of silver metal, silver nitrate, silver oxide and mixtures thereof, and (b) an inorganic support material selected from the group consisting of alumina, fluoride alumina, silica, fluorided silica, titania, magnesium aluminate and mixtures thereof; wherein said contacting is carried out at such contacting conditions as to obtain a fluid product having a lower trialkyl arsine content than said feed and to obtain a used solid sorbent material containing that portion of said at least one trialkyl arsine which has been removed from said feed.

19. A process in accordance with claim 18, wherein said fluid is a gas.

20. A process in accordance with claim 18, wherein said fluid is a hydrocarbon-containing gas.

21. A process in accordance with claim 18, wherein said trialkyl arsine has the chemical formula of $R_3As$ with each R being independently selected from the group consisting of alkyl groups containing 1-6 carbon atoms per molecule.

22. A process in accordance with claim 18, wherein said feed is a gas, and said at least one trialkyl arsine is selected from the group consisting of trimethyl arsine, triethyl arsine, dimethyl ethyl arsine and diethyl methyl arsine.

23. A process in accordance with claim 18, wherein said feed contains about 1 ppb to about 0.1 weight-% of said at least one trialkyl arsine.

24. A process in accordance with claim 18, wherein said solid sorbent material contains about 2-15 weight-% Ag.

25. A process in accordance with claim 18, wherein said feed is a gas, and said contacting conditions comprise a temperature in the range of from about $-20°$ to $100°$ C.

* * * * *